(12) United States Patent
McFarland et al.

(10) Patent No.: US 8,144,340 B2
(45) Date of Patent: *Mar. 27, 2012

(54) SURFACE SENSING DEVICE WITH OPTICAL SENSOR

(75) Inventors: Geoffrey McFarland, Wotton-under-Edge (GB); Kevyn Barry Jonas, Bristol (GB)

(73) Assignee: Renishaw PLC, Wotton-under-Edge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/926,102

(22) Filed: Oct. 26, 2010

(65) Prior Publication Data

US 2011/0043827 A1  Feb. 24, 2011

Related U.S. Application Data

(63) Continuation of application No. 11/918,524, filed as application No. PCT/GB2006/001534 on Apr. 26, 2006, now Pat. No. 7,847,955.

(30) Foreign Application Priority Data

Apr. 26, 2005  (GB) .................. 0508388.6

(51) Int. Cl.
  *G01B 11/00* (2006.01)
  *G01B 5/00* (2006.01)
  *G01N 21/86* (2006.01)
(52) U.S. Cl. ............. 356/614; 250/559.29; 33/559
(58) Field of Classification Search ......... 356/613–616, 356/622; 250/559.22, 559.44, 227.13, 227.11, 250/216; 33/556, 502–504, 559, 561
See application file for complete search history.

(56) References Cited

U.S. PATENT DOCUMENTS

| | | | |
|---|---|---|---|
| 4,574,199 A | 3/1986 | Pryor | |
| 4,792,698 A | 12/1988 | Pryor | |
| 4,870,631 A | 9/1989 | Stoddard | |
| 4,892,407 A | 1/1990 | McMurtry et al. | |
| 4,934,065 A * | 6/1990 | Hajdukiewicz et al. | ........ 33/832 |
| 5,040,306 A | 8/1991 | McMurtry et al. | |
| 5,103,572 A | 4/1992 | Ricklefs | |
| 5,118,956 A | 6/1992 | Dunning et al. | |
| 5,152,072 A | 10/1992 | McMurtry et al. | |
| 5,222,304 A | 6/1993 | Butler | |

(Continued)

FOREIGN PATENT DOCUMENTS

EP  0 373 644 A1  6/1990

(Continued)

OTHER PUBLICATIONS

International Search Report issued in International Patent Application No. PCT/GB2006/001534; mailed Jul. 4, 2006.

(Continued)

*Primary Examiner* — Sang Nguyen
(74) *Attorney, Agent, or Firm* — Oliff & Berridge, PLC

(57) ABSTRACT

A surface sensing device for use in position determining apparatus has an elongate stylus with a tip for scanning the surface of a workpiece to be measured. Lateral displacements of the stylus tip are detected by a light beam which passes along the stylus from a light source to a retroreflector. This reflects the beam back via a beamsplitter to a position sensitive detector. The stylus is mounted for longitudinal displacement on a carriage. The longitudinal displacement is measured by another light beam projected by the beamsplitter onto a second position sensitive detector.

15 Claims, 6 Drawing Sheets

U.S. PATENT DOCUMENTS

| | | | |
|---|---|---|---|
| 5,327,657 | A | 7/1994 | Hajdukiewicz et al. |
| 5,357,684 | A * | 10/1994 | Lindner et al. ............... 33/559 |
| 5,390,423 | A | 2/1995 | Butter et al. |
| 5,509,211 | A * | 4/1996 | Ernst ............... 33/561 |
| 5,517,124 | A | 5/1996 | Rhoades et al. |
| 5,659,969 | A * | 8/1997 | Butler et al. ............... 33/561 |
| 5,825,666 | A | 10/1998 | Freifeld |
| 6,014,816 | A | 1/2000 | Matsumiya et al. |
| 6,344,656 | B1 | 2/2002 | Hopkins et al. |
| 6,477,784 | B2 | 11/2002 | Schroeder et al. |
| 6,546,643 | B2 | 4/2003 | Lotze et al. |
| 6,633,051 | B1 | 10/2003 | Holloway et al. |
| 6,789,327 | B2 * | 9/2004 | Roth et al. ............... 33/556 |
| 7,124,514 | B2 | 10/2006 | McMurtry et al. |
| 7,127,825 | B2 * | 10/2006 | McMurtry et al. ............... 33/556 |
| 7,316,076 | B2 | 1/2008 | Ruijl et al. |
| 7,456,538 | B2 | 11/2008 | Nai et al. |
| 7,603,789 | B2 * | 10/2009 | Hellier et al. ............... 33/561 |
| 2005/0000102 | A1 | 1/2005 | Christoph et al. |

FOREIGN PATENT DOCUMENTS

| | | |
|---|---|---|
| EP | 0 415 579 A1 | 3/1991 |
| EP | 0 566 719 B1 | 10/1993 |
| EP | 0 544 854 B1 | 9/1996 |
| WO | WO 2004/040232 A1 | 5/2004 |

OTHER PUBLICATIONS

Chinese Office Action issued in corresponding Chinese Application No. 200680014249.1 on Dec. 19, 2011. (with English language translation).

* cited by examiner

# SURFACE SENSING DEVICE WITH OPTICAL SENSOR

This is a Continuation of application Ser. No. 11/918,524 filed Oct. 15, 2007, which is a National Phase of International Patent Application No. PCT/GB2006/001534 filed Apr. 26, 2006, which claims priority of British Patent Application No. 0508388.6 filed Apr. 26, 2005. The disclosure of the prior applications is hereby incorporated by reference herein in its entirety.

TECHNICAL FIELD

The present invention relates to a surface sensing device for use in position determining apparatus such as, for example, a coordinate measuring machine (CMM), a scanning machine, a machine tool or a measuring robot.

RELATED ART

Such machines are used for measuring workpieces, and typically comprise an arm or other member which is movable in three directions X, Y and Z relative to a table on which the workpiece is supported. Movements of the movable arm or other member in each of the X, Y and Z directions are measured by transducers on the machine, so that the position of the movable member relative to a datum position can be determined.

The surface sensing device with which the invention is particularly concerned is an analogue or measuring probe, having an elongate stylus with a workpiece-contacting tip. In use, it may be mounted on an articulating head for use in a high speed scanning operation, such as described in our U.S. Pat. No. 5,040,306. The head is mounted on the movable member of the machine, and has motors or actuators capable of orienting the axis of the probe stylus about two orthogonal axes of rotation. Transducers associated with these rotatable axes determine the direction of orientation.

During a scanning operation, the machine and/or the head cause the stylus tip to move over the surface of the workpiece, in accordance with instructions from the machine controller, to gather data about the profile of the workpiece surface. From the signals provided by the transducers of the machine and the head, and from a knowledge of the dimensions of the probe stylus, the positions of points on the surface being scanned can be estimated. However, this would only have the required accuracy if the stylus were made sufficiently rigid, which is impractical.

Our U.S. Pat. No. 6,633,051 (corresponding to International Patent Application No. WO 00/60310) shows such a probe. It includes a relatively flexible, hollow stylus, which bends laterally under the forces of contact between the stylus tip and the workpiece surface, and under inertial forces while accelerating. An optical system is provided which measures the lateral displacement of the stylus tip caused by such bending. This is then combined with the measurements from the transducers of the machine and the head.

The optical system comprises a light beam which passes along the hollow stylus. The beam is then reflected by an optical component at or near the tip, to pass back along the stylus. Lateral displacement of the stylus tip causes a lateral or tilting displacement of the returned beam, which is measured by a position sensitive detector.

The probe shown in U.S. Pat. No. 6,633,051 is capable of measuring only lateral displacements of the stylus tip.

SUMMARY

The present invention provides a surface sensing device for use in position determining apparatus, comprising:

an elongate stylus having a workpiece-sensing stylus tip;
an optical element at or near or connected to the tip so as to be subjected to lateral displacements of the tip;
an optical transducer system which projects a light beam between the optical element and a detector, thereby to measure said lateral displacements of the tip;
wherein the stylus is mounted in the surface sensing device for longitudinal displacement; and
means are provided for measuring said longitudinal displacement.

In some preferred embodiments, the means for measuring the longitudinal displacement of the stylus is optical.

DETAILED DESCRIPTION OF EMBODIMENTS

Preferred embodiments of the invention will now be described by way of example, with reference to the accompanying drawings.

Figure 1:
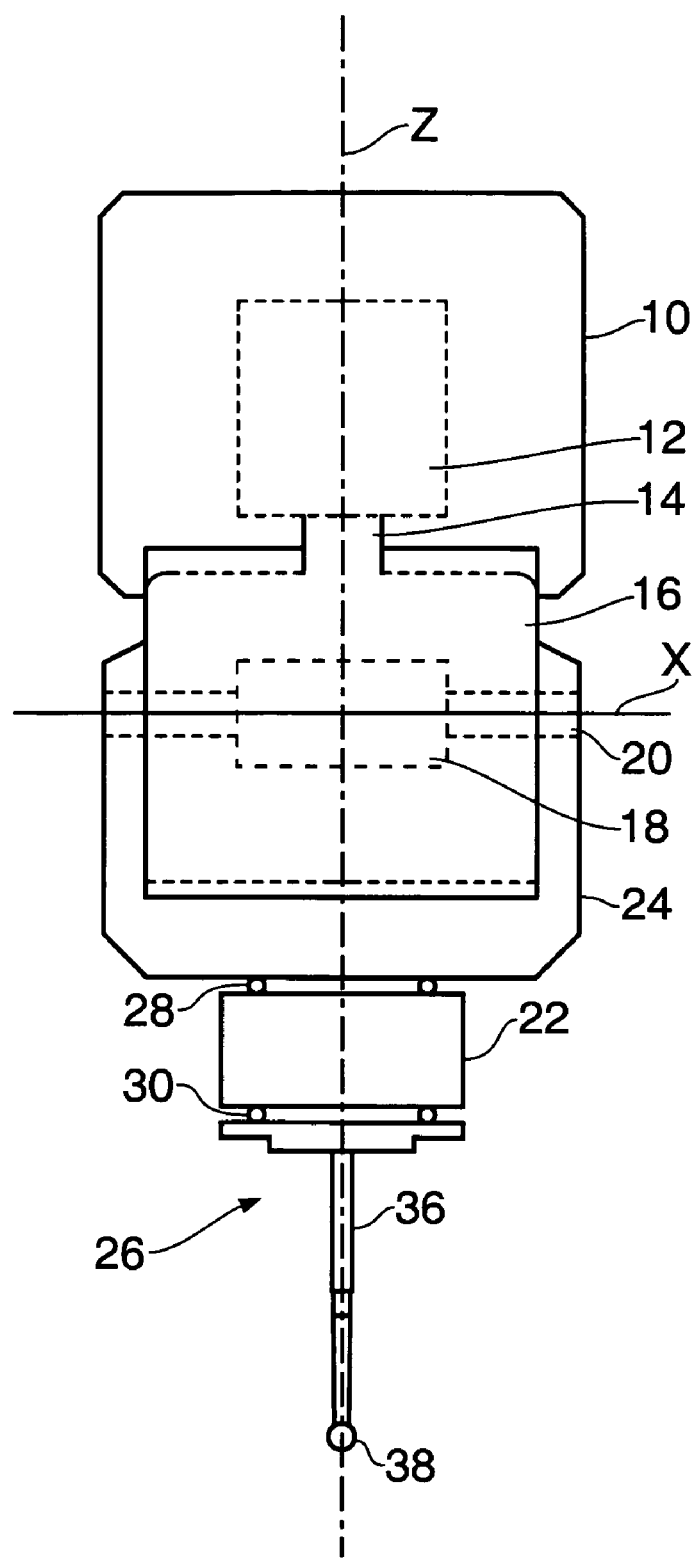
FIG. 1 is a diagrammatic representation of an articulating head with a surface sensing device.

Referring now to FIG. 1 there is shown an articulating probe head. The head comprises a first housing part 10 adapted for attachment to a position determining apparatus (not shown), and which contains a motor or actuator 12 to provide rotation of a shaft 14 about a first axis Z. Attached to the shaft 14 is a second housing part 16 which contains a second motor or actuator 18 to provide rotation of a second shaft 20 about a second, orthogonal axis X. Attached to the second shaft 20 for rotation therewith is a housing 24 which includes a support for a surface sensing device comprising a probe 22 and a stylus assembly 26. Angular transducers are associated with the axes X and Z, to measure the rotary motion and provide feedback to a controller.

Figure 2A:
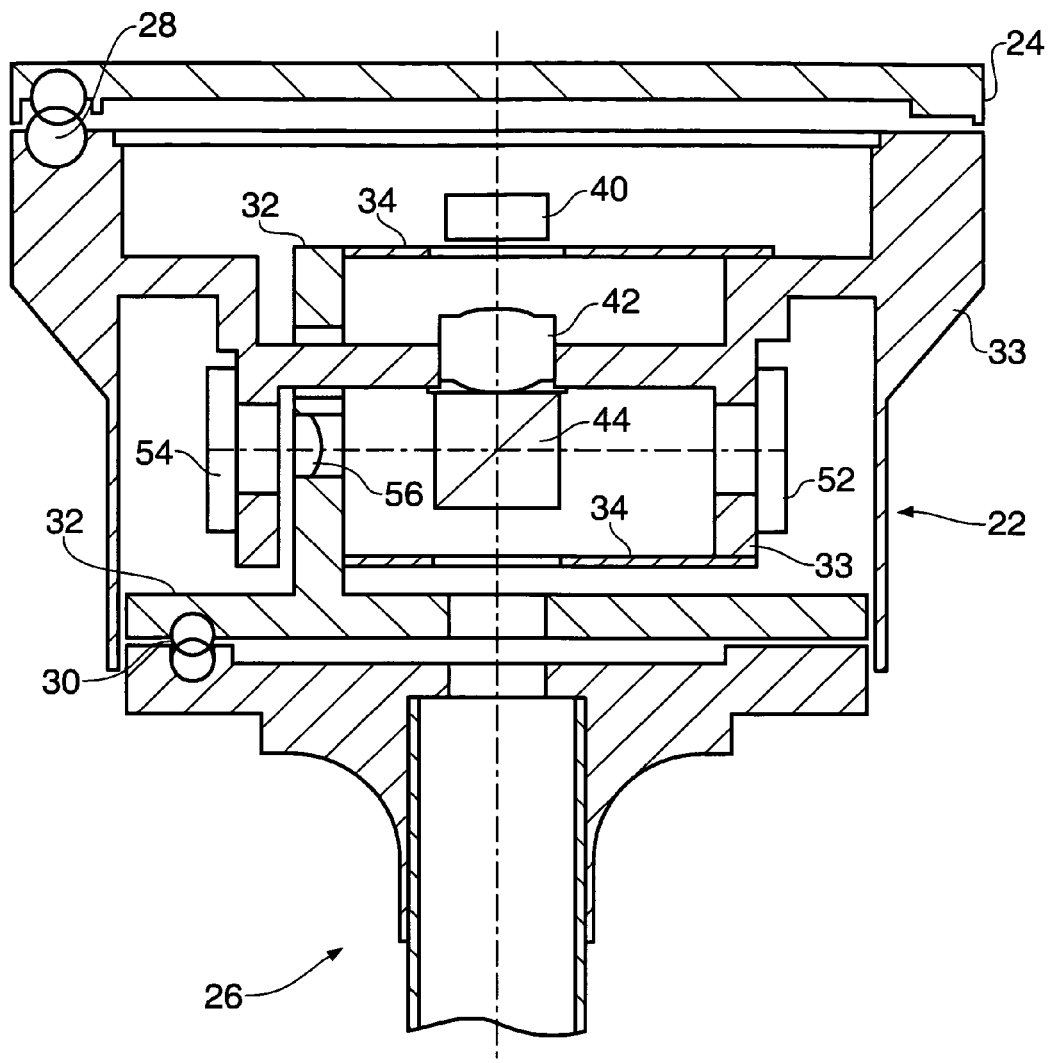
FIGS. 2A and 2B are a cross-section of a first embodiment of surface sensing device.
Figure 2B:
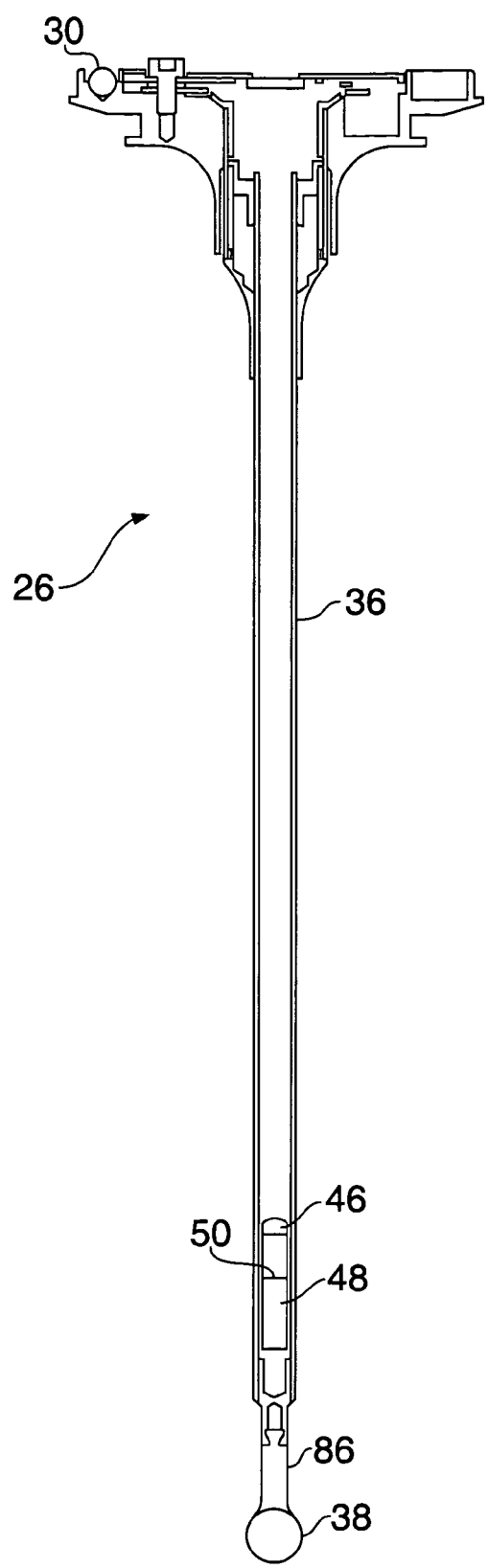

FIGS. 2A and 2B show the probe 22 and stylus assembly 26. The probe 22 is exchangeably attached to the housing or support 24 of the head via a known kinematic mount 28, into which it is attracted magnetically in known manner, so as to be easily removable and exchangeable. Likewise, the stylus assembly 26 is exchangeably attached to the probe 22 via a kinematic mount 30, into which it is similarly attracted by magnets. As well known, the kinematic mounts ensure that the probe and stylus are positioned in a precisely repeatable manner, enabling precise, repeatable measurements. The probe and stylus can be exchanged for alternative probes or styli, by automatic probe/stylus changing apparatus as described in U.S. Pat. No. 5,327,657 and European Patent No. EP 566719 (both of which are incorporated herein by reference).

The probe 22 includes a carriage 32 which is movable vertically (in the orientation seen in the drawings), i.e. in the longitudinal direction of the stylus. The stylus 26 is attached to this carriage 32 via the kinematic mount 30. The carriage 32 is mounted to the relatively fixed structure 33 of the probe 22 via two horizontally extending planar leaf springs or diaphragms 34, which permit the vertical movement but constrain lateral movements in X and Y directions.

The stylus assembly 26 includes an elongate hollow tubular stylus 36, made of carbon fibre. This is slightly flexible (resiliently) in the lateral X, Y directions and its stiffness and weight are designed to give good dynamic performance under high speed scanning conditions. It has a stylus tip 38 which contacts the workpiece during such scanning. Rather than being hollow, the stylus 36 could if desired be made of a solid transparent material such as a suitable glass.

During scanning movements, the stylus tip 38 will undergo vertical movements, permitted by the planar springs 34. It will also undergo lateral X, Y movements permitted by bending of the stylus 36. The probe 22 contains transducers to measure these movements, which will now be described.

The probe 22 includes a laser diode or other light source 40. This produces a beam of light which is collimated or brought to a focus by a lens 42. The laser diode is mounted on an adjustable clamp for alignment purposes, such that in conjunction with the lens 42 the light beam passes axially along the hollow stylus 36. Both the laser diode 40 and the lens 42 are provided on the fixed structure 33 of the probe 22.

A beamsplitter 44 is also provided on the fixed structure, to receive the light beam emitted by the lens 42. It passes 50% of the light down the stylus 36. Near the stylus tip 38, a lens 46 and a mirror surface 50 (provided on a glass cylinder 48) act as a retroreflector, to return the light beam back along the length of the stylus 36. 50% of the returned beam is reflected through 90° by the beamsplitter 44, onto a two-dimensional position sensitive detector 52 (which is located on the fixed structure 33 of the probe). This arrangement is similar to that described in U.S. Pat. No. 6,633,051. Any of the other arrangements described in U.S. Pat. No. 6,633,051 could be used instead, and that specification is hereby incorporated by reference.

When the stylus tip 38 is deflected laterally in X or Y directions, the retroreflector (optical element) 46,50 causes the returned beam to be laterally displaced by a corresponding amount in the corresponding directions X, Y. This is detected by the position sensitive detector 52. In the embodiment of FIGS. 2A and 2B, the optical transducer system includes the laser diode or other light source 40, lens 42, beamsplitter 44 and detector 52. Alternatively, with some of the arrangements shown in U.S. Pat. No. 6,633,051, the lateral displacement of the stylus tip 38 could cause a tilting displacement of the returned beam, which again is measured in the X and Y directions by the position sensitive detector 52.

The distance and the focus of the mirror/lens combination 46,50 may be adjustable. This enables adjustment of the "gain" of the probe, i.e. matching the amount of displacement of the returned beam at the detector 52 depending on the length of the stylus and the resulting amount by which the stylus tip 38 is displaceable laterally.

The other 50% of the beam emitted by the laser diode 40 and lens 42 is reflected laterally towards a second position sensitive detector 54. This is also mounted on the fixed structure 33 of the probe. However, between the beamsplitter 44 and the position sensitive detector 54, the beam passes through a lens 56 which is mounted on the vertically-movable carriage 32. Thus, the vertical position of the beam on the detector 54 is deflected, depending upon the vertical position of the carriage 32. Since the stylus assembly 26 is rigid in the longitudinal direction, the output of the detector 54 is a direct measure of the longitudinal position (Z) of the stylus tip 38. The response of the detector 54 to a given amount of vertical movement may be amplified by an appropriate choice of lens 56.

The position sensitive detector 54 could merely be a one-dimensional detector. However, it is more convenient to use a two-dimensional detector, the same as the detector 52, simply ignoring the output for the other dimension.

The outputs of the detectors 52,54 therefore give a direct indication of the three-dimensional position of the stylus tip 38, relative to the housing 24 of the articulating head. This can be combined in a known manner with the outputs of transducers in the head and of the machine, in order to determine the tip position during a scanning operation.

Other detectors can be used as the position sensitive detectors, e.g. a CCD or other camera chip, or a quad cell.

Figure 3:
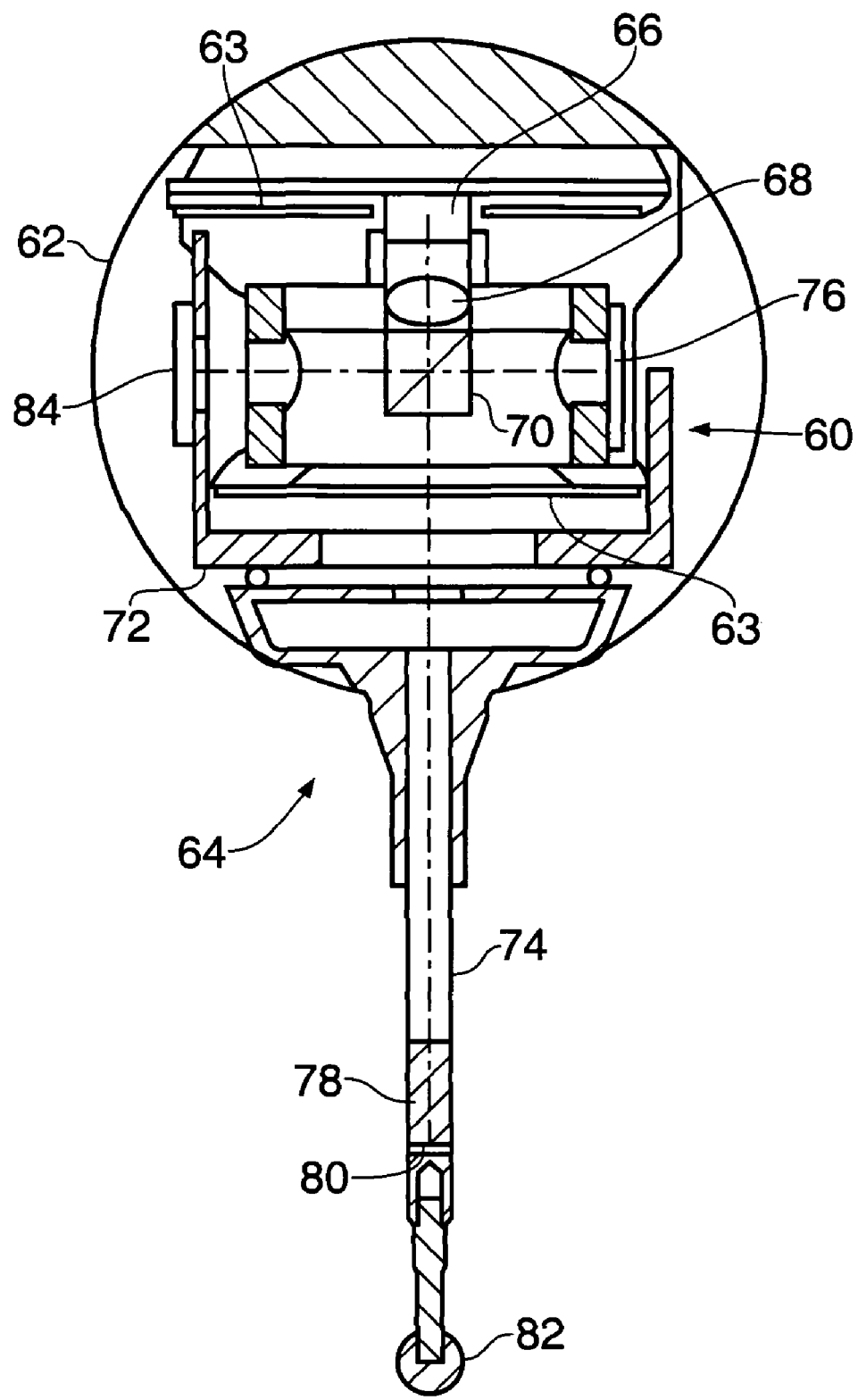
FIG. 3 is a cross-section of a second embodiment of surface sensing device.

FIG. 3 shows a cross-section through an alternative embodiment. A probe 60 is mounted on an articulating head 62, and has an exchangeable, kinematically mounted stylus assembly 64. A laser diode or other light source 66, lens 68 and beamsplitter 70 are mounted on the relatively fixed structure of the probe, and produce light beams in a similar manner to FIG. 2A. In the embodiment of FIG. 3, the optical transducer system includes the laser diode or light source 66, the lens 68, the beamsplitter 70 and a position sensitive sensor 76. The stylus assembly 64 is mounted on a vertically-movable carriage 72 via two parallel planar leaf springs or diaphragms 63, also as in FIG. 2A.

One of the light beams passes down a hollow tubular stylus 74 of the stylus assembly 64, and is retroreflected back up the stylus and directed by the beamsplitter 70 to an X, Y position sensitive detector 76. Again, this is similar to FIGS. 2A and 2B, except that this time the retroreflector (optical element) is formed by a GRIN lens 78 with a mirrored back surface 80. This arrangement measures the X, Y deflections of the stylus tip 82, as previously. In this embodiment, contrary to the previous embodiment, the vertical (Z) movement of the carriage 72 (and thus of the stylus tip 82) is measured by a position sensitive detector 84 which is mounted on the vertically-movable carriage 72.

Again therefore, the outputs of the detectors 76,84 provide a direct measurement of the movement of the stylus tip 82 in X, Y and Z directions, relative to the head 62.

Other arrangements can be envisaged in order to measure the stylus tip movements. For example, the movement in the Z direction could be measured by strain gauges mounted on the planar springs which permit the vertical movement of the carriage 32 (FIG. 2A) or 72 (FIG. 3). Or another transducer can be provided to measure the vertical movement between the carriage and the fixed structure. Or the distance along the light beam passing through the stylus can be measured interferometrically, or by the time of flight of the light beam.

Other arrangements of the beamsplitter 42 or 70 and the detectors 52,54 or 76,84 can be envisaged. For example, in FIG. 3, the beamsplitter 70 and detector 76 could both be mounted on the movable carriage 72, in order to measure the X, Y movements. The detector 84 would then be mounted on the relatively fixed structure of the probe, so that the vertical movements of the beamsplitter 70 cause the light beam to move vertically on the detector 84 and thus measure the vertical movements of the stylus tip 82.

Figure 7:
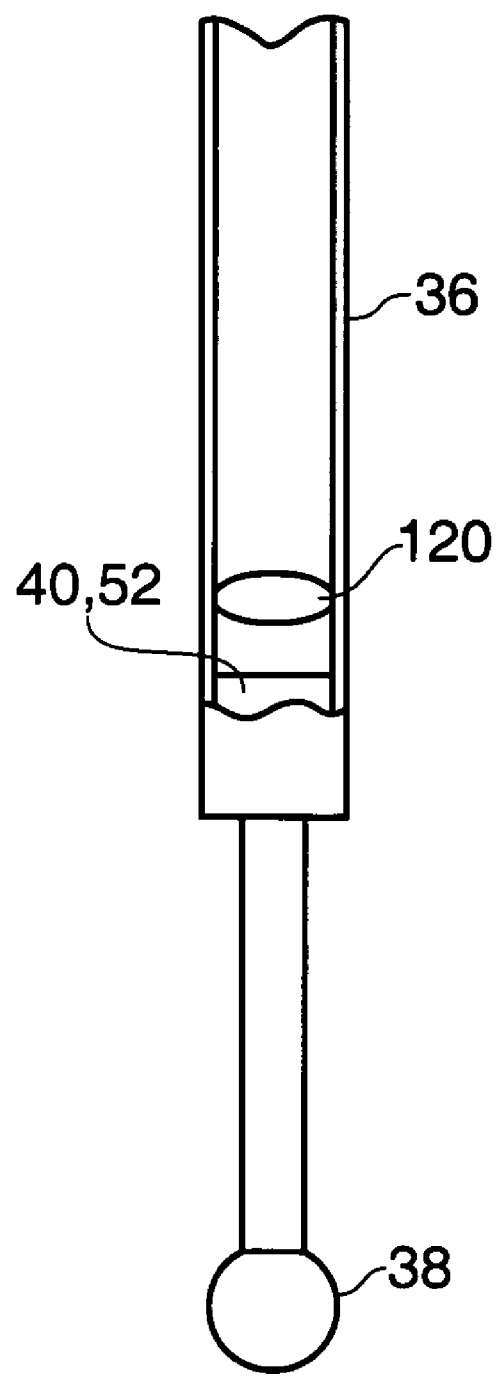

In another embodiment, instead of providing a retroreflector, the laser diode or other light source 40 may be located at the bottom end of the stylus 36 with a lens 120, as shown in FIG. 7. Or it may actually be in the stylus tip 38. It then directs a light beam up the stylus to the beamsplitter. Electrical connections to the laser diode may be provided integrally in the side wall of the stylus.

Alternatively in FIG. 7, the detector 52 may be located at the bottom end of the stylus or in the stylus tip, optionally without the lens 120, to receive light from a light source positioned within the probe body as in FIG. 2A. This has the advantage that the arrangement detects only lateral movement of the stylus tip, as required, and is insensitive to tilting of the stylus.

The above embodiments have included a stylus tip which contacts the workpiece during a scanning operation. However, the invention is also useful with a non-contacting tip, which senses the workpiece surface using a non-contact transducer, e.g. capacitively, inductively or optically. The detectors 52,54 or 76,84 then measure stylus deflections caused e.g. by inertial forces during the accelerations of the scanning movement or drooping under gravity.

In the above embodiments, FIGS. 2B and 3 show a stylus extension 86 which mounts the stylus tip 38,82 to the end of the stylus 36,74. This may be longer than shown where longer styli are required for a particular measurement task. The stylus extension may be made stiffer than the stylus 36,74 so that most bending occurs in the stylus 36,74. Or it may have a similar stiffness. In either case, the bending measured in the stylus 36,74 is proportional to the bending of the total assembly of the stylus and extension.

Figure 4:
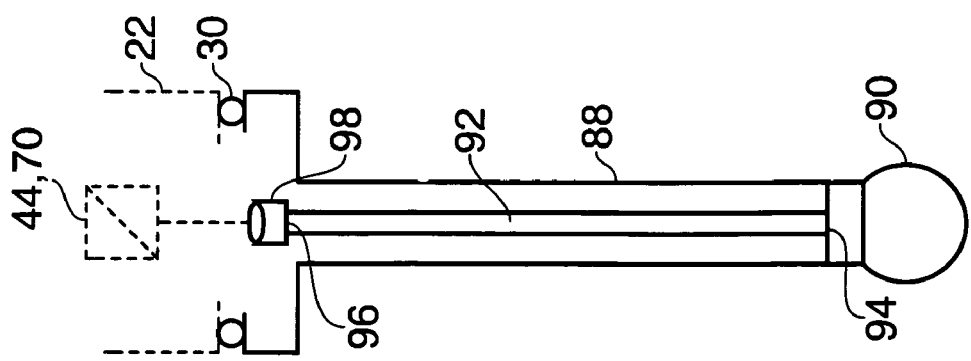

FIG. 4 shows another embodiment of the stylus assembly, which may replace the stylus assemblies 26,64 in FIGS. 2B and 3. A hollow, relatively flexible stylus 88 has a stylus tip 90, as previously. Within the stylus 88 is a relatively stiff rod 92. At one end 94 this is attached at or near the stylus tip 90. The other end 96 is free.

At the free end 96 of the rod is located a retroreflector 98 of any suitable design. This reflects the light beam from and to the beamsplitter 44,70 as in previous embodiments. Since the rod 92 is relatively stiff, the Movement of its free end 96 follows the movement of the tip 90 as the stylus 88 bends.

Figure 5:
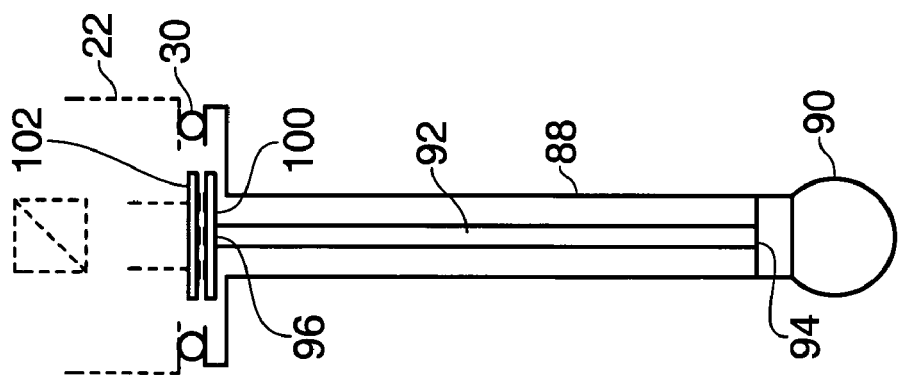

Alternatively, as shown in FIG. 5, there may be an X, Y transducer comprising a first element 100 on the free end 96 of the rod 92, and a second element 102 on the fixed structure of the probe. This X, Y transducer may be capacitive, inductive (e.g. eddy current) or an optical encoder.

Figure 6:
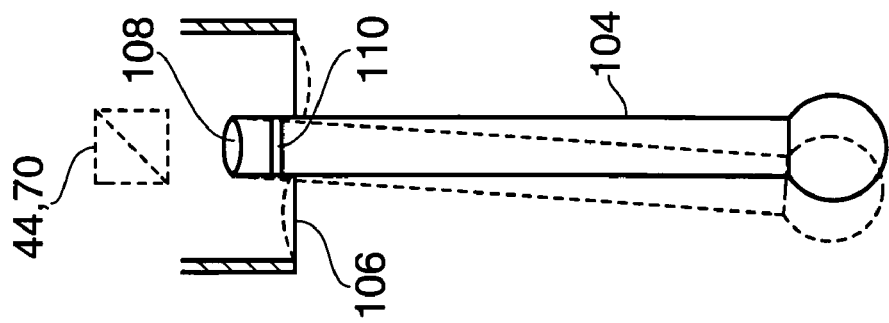
FIGS. 4, 5, 6 and 7 show alternative stylus assemblies for such devices.

FIG. 6 shows an alternative stylus assembly. It has a stylus 104 which is mounted on a planar spring or diaphragm 106. Thus, effective bending of the stylus assembly is provided by the bending of the planar spring 106 (as shown in broken lines) instead of relying on the bending of the stylus 104 itself. Another alternative would be to weaken the tubular stylus 104 by local perforations near its mounting point, in order to allow it to bend while retaining stiffness in the Z direction.

The upper end of the stylus 104 is provided with a suitable retroreflector e.g. comprising a lens 108 and mirror 110. This returns a light beam from and to the beamsplitter 44,70 as in the previous embodiments. If the lens 108 is omitted, the beam can still be returned in the same way, but will be tiltingly displaced instead of laterally displaced.

The invention claimed is:

1. A surface sensing device for use in position determining apparatus, comprising:
    an elongate stylus having a workpiece-sensing stylus tip, wherein
        the elongate stylus has a relatively flexible portion permitting bending and a stylus extension,
        the stylus extension is stiffer than the relatively flexible portion,
        the stylus extension is closer to the stylus tip than the relatively flexible portion is to the stylus tip, and
        the stylus tip is subjected to lateral displacements caused by the bending; and
    a transducer system which measures lateral displacements of the stylus tip, including those caused by the bending.

2. A surface sensing device according to claim 1, wherein the transducer system is optical.

3. A surface sensing device according to claim 2, wherein the transducer system includes an optical element at or near or connected to the stylus tip so as to be subjected to the lateral displacements of the stylus tip, and a detector, and wherein the transducer system projects a light beam between the optical element and the detector.

4. A surface sensing device according to claim 1, comprising:
    a mounting for the elongate stylus in the surface sensing device which enables longitudinal displacement of the elongate stylus; and
    a displacement measurement transducer arranged to measure the longitudinal displacement of the elongate stylus.

5. A surface sensing device according to claim 4, comprising a probe, wherein the probe comprises a longitudinally movable carriage, to which the elongate stylus is exchangeably attached, and wherein the displacement measurement transducer is arranged to measure longitudinal displacement of the carriage.

6. A surface sensing device according to claim 1, comprising a probe, wherein the elongate stylus is exchangeably attached to the probe.

7. A surface sensing device according to claim 6, wherein the exchangeable elongate stylus adjusts the gain of the transducer system which measures the lateral displacements of the stylus tip.

8. A surface sensing device for use in position determining apparatus, comprising:
    an elongate stylus having a workpiece-sensing stylus tip, wherein
        the elongate stylus has a relatively weakened portion permitting bending and a stylus extension,
        the stylus extension is stiffer than the relatively weakened portion,
        the stylus extension is closer to the stylus tip than the relatively weakened portion is to the stylus tip, and
        the stylus tip is subjected to lateral displacements caused by the bending; and
    a transducer system which measures lateral displacements of the stylus tip, including those caused by the bending.

9. A surface sensing device according to claim 8, wherein the relatively weakened portion comprises local perforations of the elongate stylus.

10. A surface sensing device according to claim 8, wherein the transducer system is optical.

11. A surface sensing device according to claim 10, wherein the transducer system includes an optical element connected to the stylus tip so as to be subjected to the lateral displacements of the stylus tip, and a detector, and wherein the transducer system projects a light beam between the optical element and the detector.

12. A surface sensing device according to claim 8, comprising:
    a mounting for the elongate stylus in the surface sensing device which enables longitudinal displacement of the elongate stylus; and a displacement measurement transducer arranged to measure the longitudinal displacement of the elongate stylus.

13. A surface sensing device according to claim 12, comprising a probe, wherein the probe comprises a longitudinally movable carriage, to which the elongate stylus is exchangeably attached, and wherein the displacement measurement transducer is arranged to measure longitudinal displacement of the carriage.

14. A surface sensing device according to claim 8, comprising a probe, wherein the elongate stylus is exchangeably attached to the probe.

15. A surface sensing device according to claim 14, wherein the exchangeable elongate stylus adjusts the gain of the transducer system which measures the lateral displacements of the stylus tip.

\* \* \* \* \*